Figure 1:
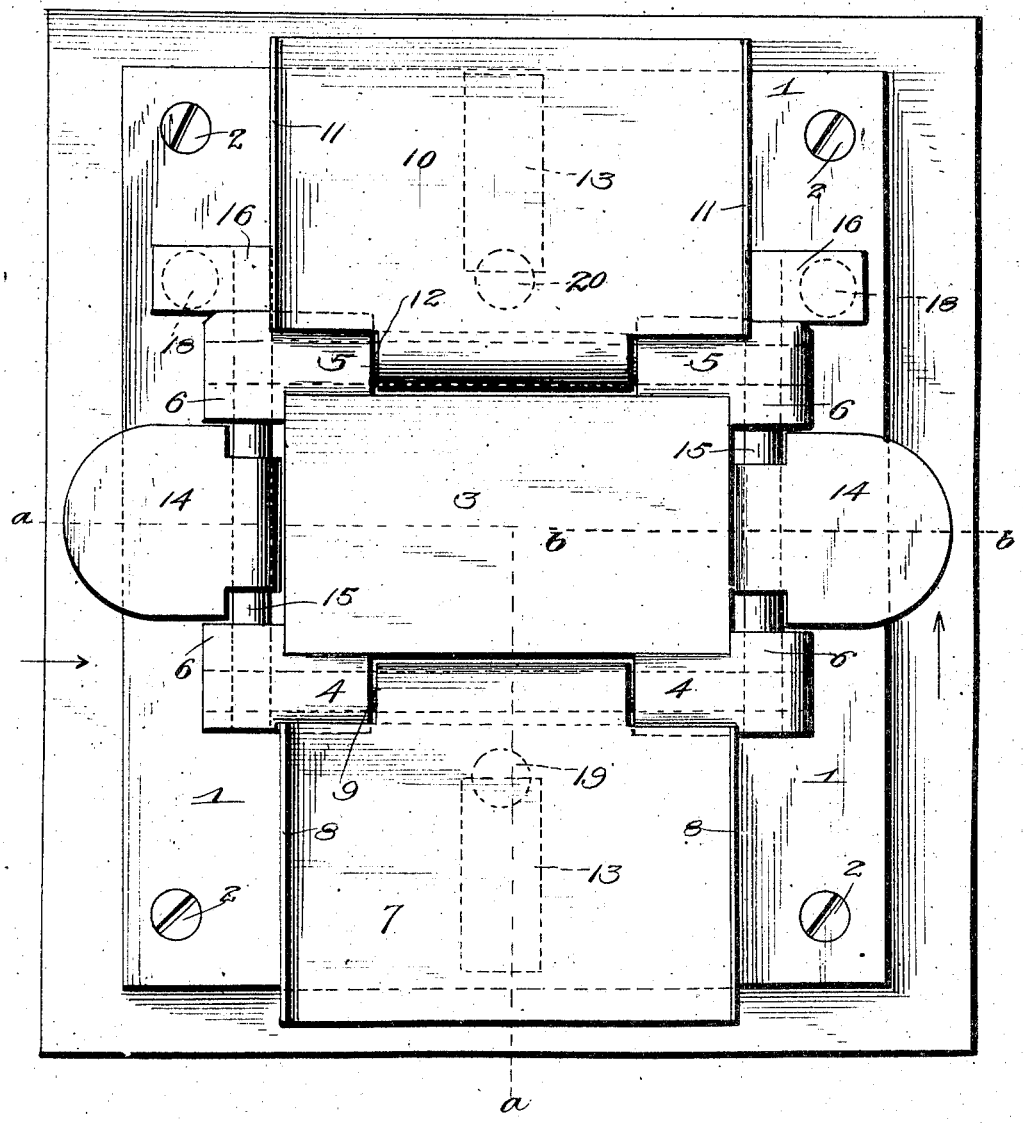

No. 755,462. PATENTED MAR. 22, 1904.
A. A. DEISER.
WRAPPING PAPER FOLDING MACHINE.
APPLICATION FILED SEPT. 21, 1903.
NO MODEL. 2 SHEETS—SHEET 1.

Witnesses
Inventor
Albert A. Deiser
By H. B. Wilson
Attorney

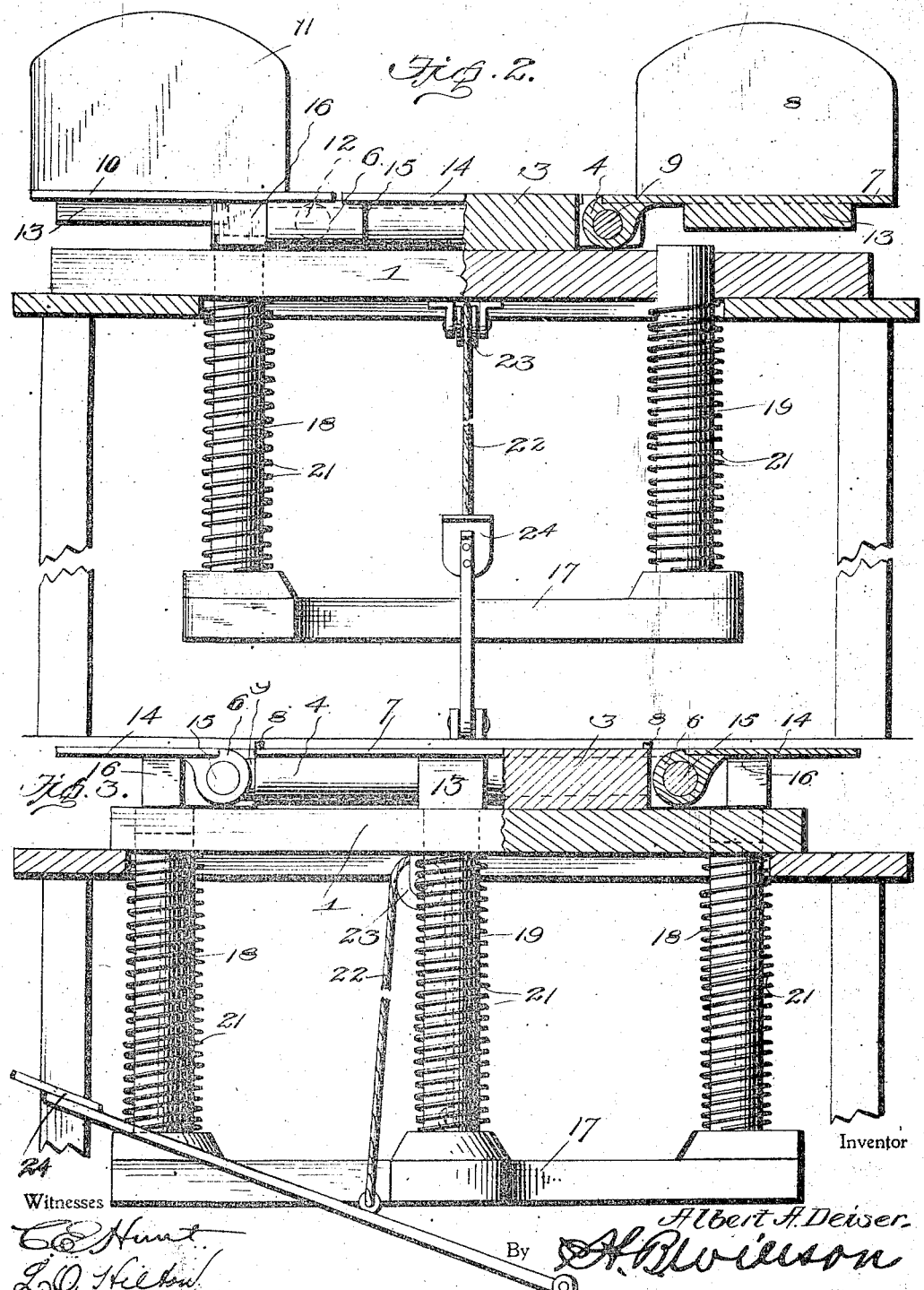

No. 755,462. Patented March 22, 1904.

UNITED STATES PATENT OFFICE.

ALBERT A. DEISER, OF CHICAGO, ILLINOIS.

WRAPPING-PAPER-FOLDING MACHINE.

SPECIFICATION forming part of Letters Patent No. 755,462, dated March 22, 1904.

Application filed September 21, 1903. Serial No. 174,036. (No model.)

*To all whom it may concern:*

Be it known that I, ALBERT A. DEISER, a citizen of the United States, residing at Chicago, in the county of Cook and State of Illinois, have invented certain new and useful Improvements in Wrapping-Paper-Folding Machines; and I do declare the following to be a full, clear, and exact description of the invention, such as will enable others skilled in the art to which it appertains to make and use the same.

My invention is an improved machine for wrapping folding-paper around mincemeat and other moist and semifluid substances to prevent the juices thereof from running out and becoming lost and to prevent the outer casing or carton in which the same is inclosed from becoming soiled; and it consists in the construction and combination of devices hereinafter described and claimed.

In the accompanying drawings, Figure 1 is a top plan view of a wrapping-paper-folding machine embodying my improvements, showing the wings thereof disposed in a horizontal position. Fig. 2 is partly an elevation of the same and partly a sectional view taken on the plane indicated by the line $a\,a$ of Fig. 1. Fig. 3 is a similar view, the plane of its section being indicated by the line $b\,b$ of Fig. 1.

In the embodiment of my invention here shown I employ a base-plate 1 of oblong rectangular form, which in practice is supported on the top of a table, counter, or stand and may be secured thereto by means of screws or other suitable devices 2. On the central portion of the said base-plate is a similarly-shaped plate 3. At the corners of the said plate 3 are bearings 4, 5, and 6, the bearings 4 5 being at opposite sides of the plate 3 and the bearing 6 being at the ends thereof. A front wing 7, which is preferably of oblong rectangular form and provided at its ends with ears 8, disposed at right angles thereto and extending from its inner or upper side, is pivotally mounted on a pintle or shaft 9, which is journaled in the bearings 4. A rear wing 10, which is similar in shape to the front wing 7, but is slightly longer than the front wing, and which has ears 11 at its ends to overlap the ears 8 of the wing 7 when both of said wings are turned to an upright or vertical position, is pivotally mounted on the pintle or shaft 12, which is journaled in the bearings 5. The said front and rear wings are provided on their outer sides with weights 13, which normally open them and dispose them in a horizontal position on the base-plate 1. End wings 14, which are preferably of the form here shown and with their outer portions semicircular in shape, are disposed at the ends of the plate 3 and are provided with pivot shafts or pintles 15, which are journaled in the bearings 6. The said pivoted shafts or pintles 15 are provided at their ends with outwardly-extended weighted arms 16, which serve to normally open the wings 14—that is to say, to extend them in a horizontal position from the ends of the plate 3.

A vertically-movable operating-head 17, which in practice is preferably T-shaped, is disposed at a suitable distance below the base-plate 1 and is provided with vertically-disposed operating-rods 18, which engage the weight-arm 16 of the pivots of the wings 14 with the operating-rod 19 to engage the under side of the front wing 7, and with a similar operating-rod 20 to engage the under or outer side of the rear wing 10. The operating-rods 18 are somewhat longer than the rod 20, and the latter is somewhat longer than the rod 19—that is to say, the upper ends of the said rods are in different vertical planes. Hence when the head 17 is elevated its rods 18 first turn the wings 14 to a vertical position, its rod 20 immediately thereafter turns the wing 10 to a vertical position, so that its ears 11 pass on the outer sides of the wings 14, and the front wing 7 is then turned to a vertical position by the rod 19, so that its lugs 8 pass on the outer sides of the wings 14 and between the latter and the lugs 11, the said lugs 8 and 11 overlapping each other, as will be understood, and serving to maintain the wings 14 in a vertical position.

A piece of paraffin or oiled wrapping-paper having been placed on the plate 3 and the material to be wrapped having been placed thereon before the operating-head 17 has been thus operated, it will be understood that the wings 7, 10, and 14 as they are thus turned to a vertical position serve to fold up the paper around the sides of the substance to be wrapped, in effect making a coverless box out of the wrapping-paper, and the operator then folds the upturned edges of the paper appropriately over the substance and completes the wrapping of the same. The operating-head 17 is then lowered, thereby causing the operating-rods to disengage the respective wings and the weights of the latter to cause them to reassume their normal horizontally-extended position, and the wrapped material is then removed from the plate 3. Within the scope of my invention any suitable means may be employed for operating the head 17. I here show coiled extensile springs 21 on the rods 18 19 20 to depress them, and the head 17 and an operating-cord 22, engaged with a direction-sheave 23 and having its ends attached, respectively, to the head 17 and to a pedal 24 for raising said head and rods to turn the wings to a vertical position.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. A wrapping-paper-folding machine comprising a fixed central portion, a table on which it is secured, side wings pivotally mounted at opposite sides of the table, having weights to lower them and provided at their ends with lugs at right angles thereto, to overlap at the ends of the fixed central portion, pivotally-mounted end wings at the ends of the fixed central portion, a vertically-movable operating-head below the table, means to actuate the head, rods, of unequal length, projecting from the upper side of the head, guides for said rods, and springs to depress the head, said rods on the upstroke of the head successively upturning the end and side wings in the order named, the overlapping end lugs of the side wings passing over the outer sides of the end wings, substantially as described.

2. A folding-machine of the class described, comprising a relatively fixed center piece, wings at the sides thereof adapted to be turned to an upright position, oppositely-disposed wings, having fixed coöperating lug portions at right angles thereto to pass on the outer sides of the first-mentioned wings when the wings are in an upright position, and means to operate the wings.

In testimony whereof I have hereunto set my hand in presence of two subscribing witnesses.

ALBERT A. DEISER.

Witnesses:
FRED. F. ALLEN,
OSCAR M. OLSEN.